United States Patent
Satoh

[11] Patent Number: 6,122,420
[45] Date of Patent: Sep. 19, 2000

[54] OPTICAL LOOPBACK APPARATUS

[75] Inventor: Yoshinori Satoh, Tokyo, Japan

[73] Assignee: Ando Electric Co., Ltd., Tokyo, Japan

[21] Appl. No.: 09/050,456

[22] Filed: Mar. 30, 1998

[30] Foreign Application Priority Data

Mar. 31, 1997  [JP]  Japan .................... 9-081427

[51] Int. Cl.[7] .................................... G02B 6/26
[52] U.S. Cl. .................. 385/33; 385/34; 385/47
[58] Field of Search ................... 385/33, 34, 35, 385/18, 23, 47, 45, 51, 79

[56]  References Cited

U.S. PATENT DOCUMENTS 5,181,264  1/1993  Chiaretti et al. ..................... 385/33
5,757,993  5/1998  Abe ..................................... 385/34

Primary Examiner—Hung N. Ngo
Attorney, Agent, or Firm—Fish & Richardson P.C.

[57]  ABSTRACT

An optical loopback apparatus provides a basis for miniaturizing the loop back mechanism so as to enable optical attenuation and wavelength multi/demultiplexing operations to be carried out in a compact device. An optical fiber unit has two single core fibers for input and output fiber paths. By aligning the central axis between the cores with the optical axis of a lens having a refractive index distribution of 0.25 pitch, the input beam into the apparatus is wholly reflected back 180 degrees by a total reflection film provided at the output terminal surface of the lens. In another arrangement, the optical axis of all four components: the central axis of the input and output fiber paths; the first lens; a second lens and a second optical fiber; are aligned, then, an input beam into the first lens is partially looped back 180 degrees at the reflective film.

10 Claims, 6 Drawing Sheets

OPTICAL LOOPBACK APPARATUS

BACKGROUND OF THE INVENTION

1. Field of the Invention

The present invention relates to an optical loopback apparatus for changing the direction of incident light for evaluation of optical fibers and determination optical properties.

This application is based on patent application No.Hei09-081427 filed in Japan, the content of which is incorporated herein by reference.

2. Description of the Related Art

Figure 7:
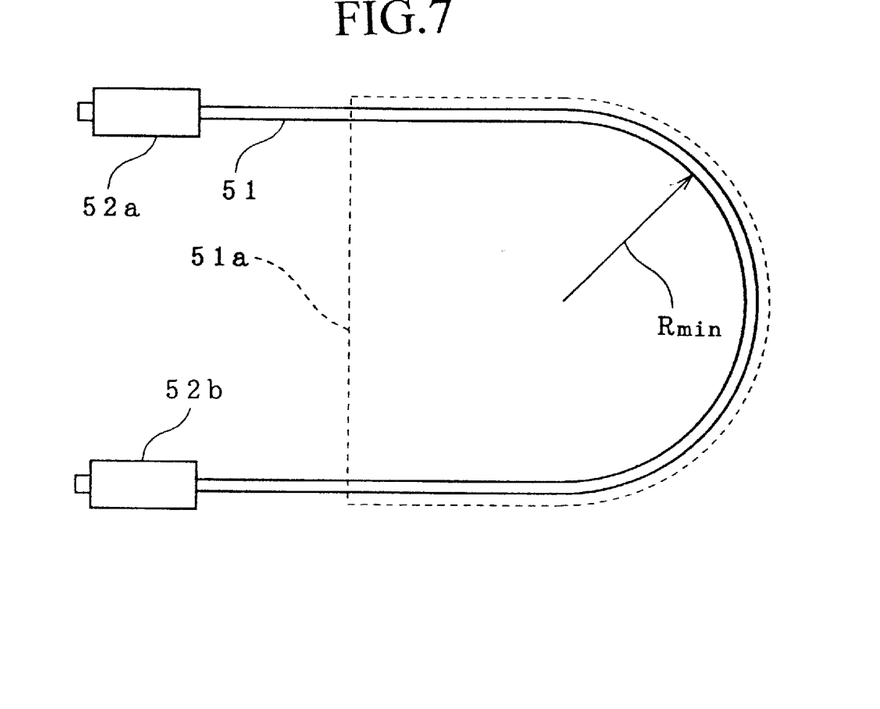
FIG. 7 is a schematic drawing of an example of the conventional optical loopback apparatus.

FIG. 7 is a schematic drawing of an example of the conventional optical loopback apparatus. An optical loopback apparatus is a device to turn the direction of propagation of an incident beam of light 180 degrees back in the opposite direction, and is comprised in general of an optical fiber 51 having an optical plug 52a at one end, and another optical plug 52b at the opposite end of the fiber. Looping back of the beam is achieved by bending the optical fiber 51 in the loopback apparatus with a minimum radius of curvature $R_{min}$, so that the output surfaces of the optical plugs 52a, 52b face in the same direction, i.e., to the left in the case shown in FIG. 7.

In such a loopback apparatus, in order to turn the optical fiber 51 about the minimum radius of curvature $R_{min}$, it is necessary to secure a sufficient space represented by a bending range 51a shown in FIG. 7. For example, for a commonly used minimum radius of curvature $R_{min}$ of about 30 mm, the bending range 51a is about 60 mm which is a serious barrier to achieving miniaturization of the loopback apparatus.

Figure 8:
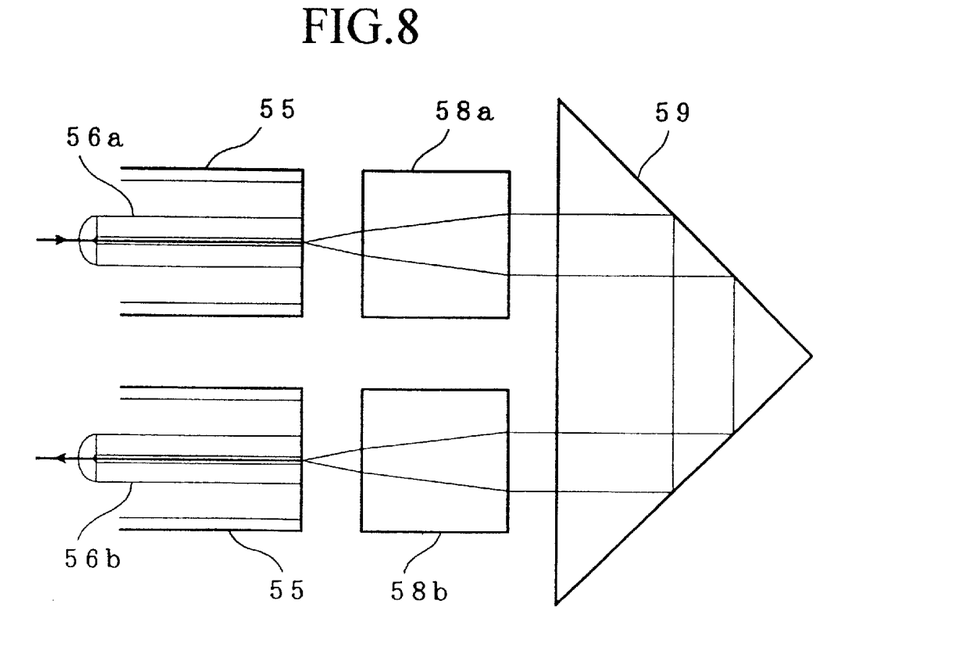
FIG. 8 is a cross sectional side view of another example of the conventional optical loopback apparatus.

FIG. 8 is a cross sectional view of another example of the conventional optical loopback apparatus. Incident beam of light is propagated through an optical fiber 56a having a ferrule 55 at one end (at right end in FIG. 8).

The beam is input into a lens 58a which converts it to a parallel beam of light which is directed into a prism 59, which reflects the input beam twice to turn the direction of propagation of the parallel beam 180 degrees. The parallel beam turned around by and output from the prism 59 passes through another lens 58b, and is injected into another optical fiber 56b having a similar ferrule 55 as that for the optical fiber 56a, and is propagated through the optical fiber 56b as an output beam.

According to the construction of the loopback apparatus shown in FIG. 8, it becomes necessary to align optical axes of the two optical paths: i.e., optical fiber 56a and ferrule 55 with the optical axis of lens 58a, on the one hand, and optical fiber 56b and ferrule 55 with the optical axis of lens 58b on the other. Therefore, it is necessary to have a mechanical arrangement such that each component in the apparatus can be independently manipulated.

Therefore, it is clear that, regardless of the type of loopback apparatus chosen, it has been difficult to reduce size or weight of the apparatus or to simplify its construction.

SUMMARY OF THE INVENTION

It is an object of the present invention to provide an optical loopback apparatus to perform optical attenuation or multiplexing and demultiplexing of optical signals using an apparatus of a simple and compact design.

The object has been achieved in an optical loopback apparatus comprising: a first optical fiber having an input fiber path and an output fiber path formed into an integral parallel unit; and a first lens having a one terminal surface coupled optically to one end section of the first optical fiber and having a reflective film formed on an other terminal surface opposing the one terminal surface; wherein, a central axis between the input fiber path and the output fiber path is aligned with an optical axis of the first lens.

An aspect of the basic apparatus is that the first lens is provided with a refractive index distribution having a 0.25 pitch.

Another aspect of the basic apparatus, or the apparatus having a specific refractive index distribution, is that the reflective film is comprised by a total reflection film which reflects a beam injected into the input fiber path back to the output fiber path without loss of optical energy.

Another aspect of the basic apparatus, or the apparatus having a specific refractive index distribution, is that the reflective film is comprised by a reflective film having a selected optical attenuation factor and reflects back a beam injected into the input fiber path at a specific reflection factor to the output fiber path.

A final aspect of the basic apparatus, or the apparatus having a specific refractive index distribution, is that the reflective film is comprised by a specific wavelength-selective film and reflects back, in whole, such having not less than one specific wavelength or not less than a specific range of wavelengths to be output from the output fiber path.

The object has also been achieved in another variation of the basic optical loopback apparatus comprising: a first optical fiber having an input fiber path and a output fiber path formed into an integral parallel unit; a first lens having a one terminal surface coupled optically to one end section of the first optical fiber and having a reflective film formed on an other terminal surface opposing the one terminal surface; a second lens having a one terminal surface opposing the reflective film formed on the first lens; and a second optical fiber having an input surface opposing an other terminal surface of the second lens; wherein a central axis between the input fiber path and the output fiber path, an optical axis of the first lens, an optical axis of the second lens and an optical axis of the second optical fiber are aligned.

An aspect of the variation of the basic apparatus is that the first lens is provided with a refractive index distribution having a 0.25 pitch.

An aspect of the variation of the basic apparatus, or the apparatus having a specific refractive index distribution, is that the reflective film is comprised by a reflective film which reflects back a beam of light injected into the input fiber path at a specific reflection factor and transmits remaining portion of light at a selected optical transmission factor to be output to the second optical fiber, thereby distributing the input beam of light in a specific distribution ratio.

A final aspect of the variation of the basic apparatus, or the apparatus having a specific refractive index distribution, is that the reflective film is comprised by a wavelength-selective film which reflects back, in whole, such light having not less than one wavelength or a specific range of wavelengths, to the output fiber path, and transmits such light having not less than one wavelength, exclusive of a reflected wavelength, or such light having not less than a specific range of wavelengths, thereby providing a wavelength multi/demultiplexing capability.

Accordingly, in the basic apparatus of the present invention, by optically aligning the central axis between the input/output fiber paths with the optical axis of the first lens (having a refractive index distribution of 0.25 pitch), an input beam of light injected into the first lens is looped back by being reflected back 180 degrees at the reflective film. In this case, the reflection film may reflect back the input beam of light to the output fiber path without any loss of optical energy. The reflective film may also be a type that gives a certain degree of optical attenuation to the input beam, and reflects the attenuated beam of light back at a specific reflection factor to the output fiber path. Or, the reflective film may be of a type that reflects an input beam of light, having more than one specific wavelength or a specific range of wavelengths, back to the output optical path while giving a certain degree of optical attenuation.

The basic loopback apparatus can be modified to serve other advanced optical applications by optically aligning the central axis between the input/output fiber paths with the optical axis of the first lens (having a refractive index distribution of 0.25 pitch), the optical axis of the second lens and the optical axis of the second optical fiber. In the modified loop back apparatus, a portion of the input light injected into the first lens is looped back, 180 degrees, to the output fiber path by being reflected at the reflective film. In this case, the input light is reflected at a specific reflection factor back to the output fiber path, so that the input light can be split into the output fiber path and the second optical fiber in a selected dividing ratio. Or, the reflective film may be of a type that reflects an input light, excepting the wavelength of the reflected light, having more than one specific wavelength or a specific range of wavelengths back to the output fiber path while transmitting more than one specific wavelength or a specific range of wavelengths to the output fiber path, so as to split the input light into defined wavelengths and thereby providing a function of wavelength multi/demultiplexing in a loopback apparatus having a simple, miniaturized construction.

DESCRIPTION OF THE PREFERRED EMBODIMENTS

In the following, preferred embodiments will be presented with reference to the drawings.

Embodiment 1

Figure 1:
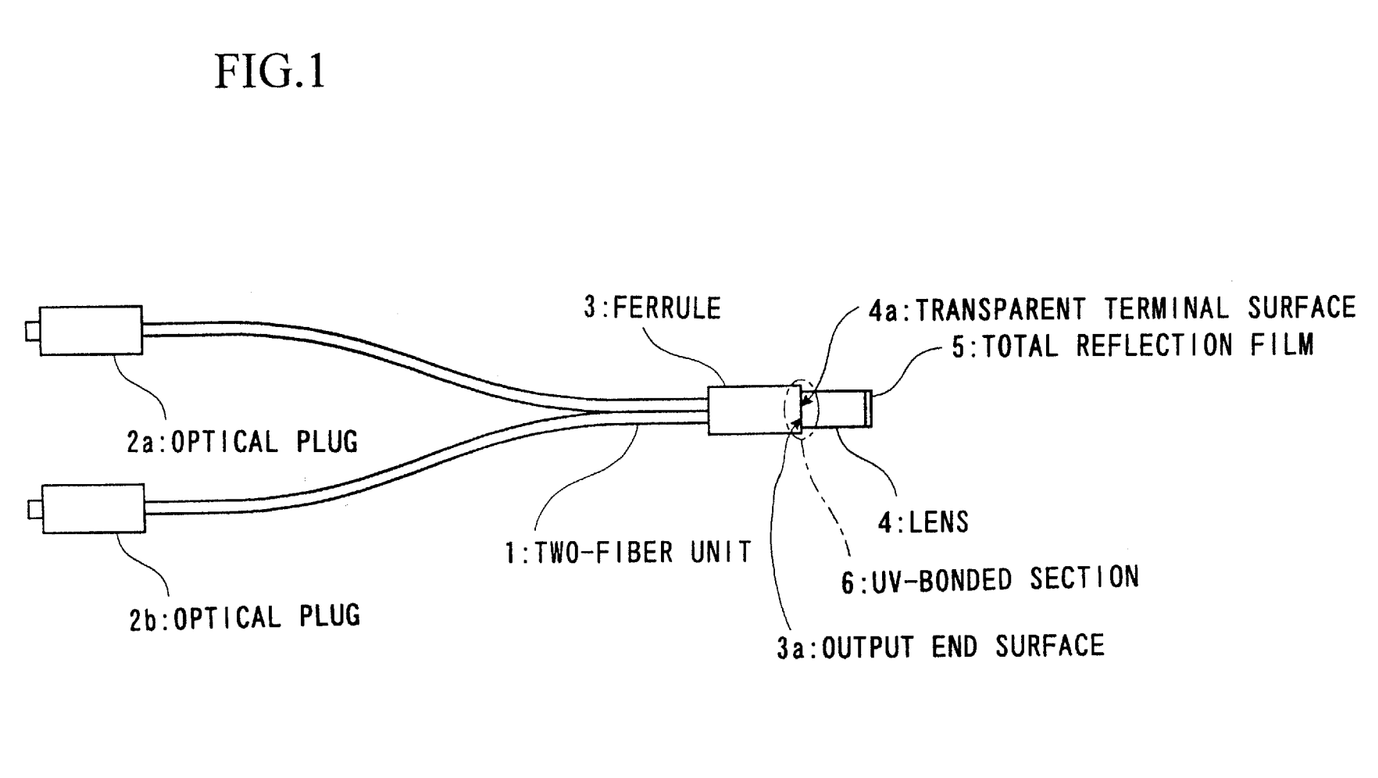
FIG. 1 is a schematic drawing of a first embodiment of the optical loopback apparatus of the present invention.

FIG. 1 is a schematic illustration of a first embodiment of the optical loopback apparatus of the present invention based on a two-fiber unit 1 comprised by two single-mode fibers.

Optical plugs 2a, 2b are provided for each core, respectively, at one end (left end in FIG. 1) of the fiber 1. At the opposite end of the fiber 1 (right end in FIG. 1), a ferrule 3 is attached, and a lens 4 is provided at the terminal end of the apparatus to reflect back the incident beam. The lens 4 has a refractive index distribution of 0.25 pitch and a total reflection film 5 is formed at one terminal surface (right end in FIG. 1).

The output end surface 3a of the ferrule 3 and the transparent terminal surface 4a of the lens 4 opposing the total reflection film 5 are UV-bonded (bonding with a resin which can be hardened by irradiating with ultra-violet light) to produce an optical quality interface, and will be referred to as UV-bonded section 6.

Figure 2A:
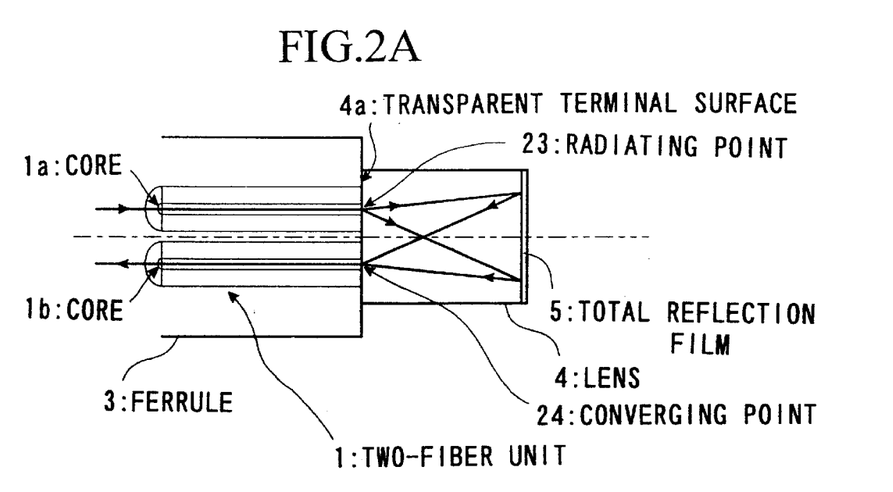
FIGS. 2A, 2B are cross sectional side views showing the details of the ferrule and the lens in the first embodiment.
Figure 2B:
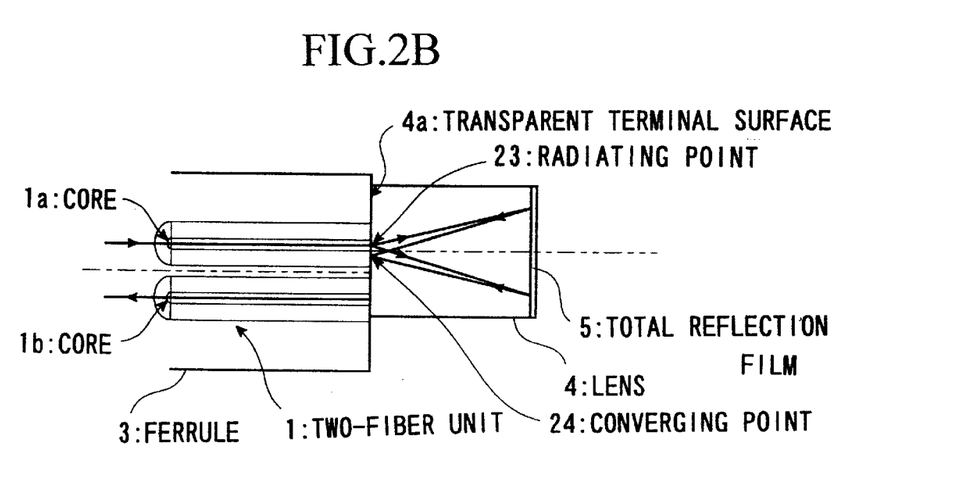

FIGS. 2A & 2B are cross sectional side views showing the details of the arrangement of the ferrule 3 and the lens 4. This embodiment relates to a two-fiber unit 1 comprised by two single-mode fibers having a core diameter of about 10 μm for the cores 1a, 1b. Because the separation distance between the two cores 1a, 1b in such a fiber unit 1 is small, about 250 μm as an example, it is possible to place two cores 1a, 1b within an effective diameter of one lens 4.

FIG. 2A shows a working state of the loopback apparatus of this embodiment. Specifically, the central axis between the cores 1a and 1b (represented by a single-dot and dash line) is aligned with the optical axis of the lens (represented by a double-dot and dash line) 4, so that the core 1a and core 1b are positioned in a line symmetry with respect to the optical axis of the lens 4.

When a beam of light is injected into core 1a of the fiber unit 1 from a light source of any description towards the transparent terminal surface 4a of the lens 4, the output beam from the opposite terminal surface of the lens 4 would normally form a parallel beam. However, because a total reflection film 5 is formed on the terminal surface opposite to the transparent terminal surface 4a, the input beam does not form a parallel beam, but is converged to a certain point on the transparent terminal surface 4a. The converging point and the radiating point are located on positioned in a line symmetry with respect to the optical axis of the lens 4.

For example, as illustrated in FIG. 2A, if a beam of light is injected into core 1a of the two fiber unit 1 so that output beam radiates from the radiating point 23 on the transparent terminal surface 4a of the lens 4, then the beam is reflected totally by the total reflection film 5, and is converged on the converging point 24 on the transparent terminal surface 4a.

As mentioned above, the converging point 24 is located on a line symmetry to the radiating point 23. Therefore, by aligning the converging point 24 with core 1b of the two fiber unit 1, the input beam is propagated through core 1b of the two fiber unit 1.

Therefore, in this loopback apparatus, the apparatus is constructed such that, by aligning the central axis between the cores 1a, 1b of a two fiber unit 1 with the optical axis of the lens 4, the core 1b is aligned with the converging point 24, thereby looping the input beam of light back through the core 1b.

FIG. 2B is an example in which the central axis between the cores 1a, 1b is not coincident with the optical axis of the lens 4. In this case, the core 1a and core 1b are not located in a position of a line symmetry with respect to the optical axis of the lens 4.

Therefore, in the example shown in FIG. 2B, when the core 1a is positioned at the radiating point 23, the core 1b is not positioned at the converging point 24, therefore, input beam is not propagated through the core 1b.

Embodiment 2

Figure 3:
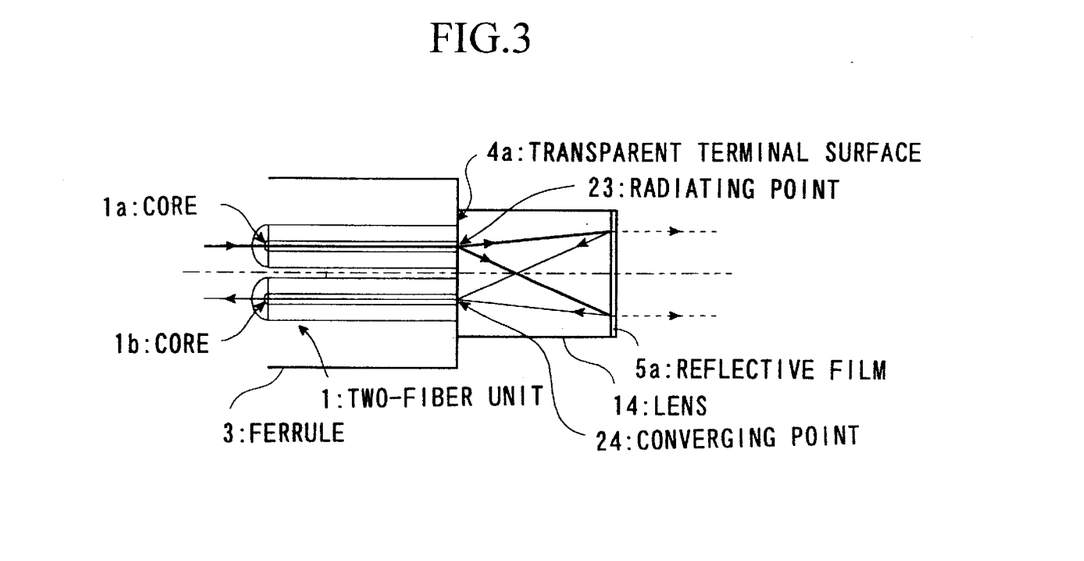
FIG. 3 is a cross sectional side view of a second embodiment of the loopback apparatus of the present invention.

FIG. 3 is a cross sectional side view of an optical loopback apparatus of the second embodiment. In FIG. 3, those parts which are the same as those in FIG. 1 or FIGS. 2A, 2B are referred to by the same reference numerals, and their explanations are omitted.

The lens 14 shown in FIG. 3 has a refractive index distribution of 0.25 pitch, and is provided with a reflective film 5a on one terminal surface (right end in FIG. 3). The central axis between the cores 1a, 1b is aligned with the optical axis of the lens 14.

The reflective film 5a shown in FIG. 3 may have any reflection factor, and can be adjusted to suit any particular application.

For example, suppose the reflective film 5a has a reflection factor of 50%, then 50% of the light entering the core 1a is reflected at the reflective film 5a and propagates through the core 1b. The light not reflected at the reflective film 5a passes therethrough the reflective film 5 to be output from the lens 14.

An optical loopback apparatus having such a construction can also function as an optical attenuator by assigning an appropriate attenuation factor to the reflective film 5a.

Embodiment 3

Figure 4:
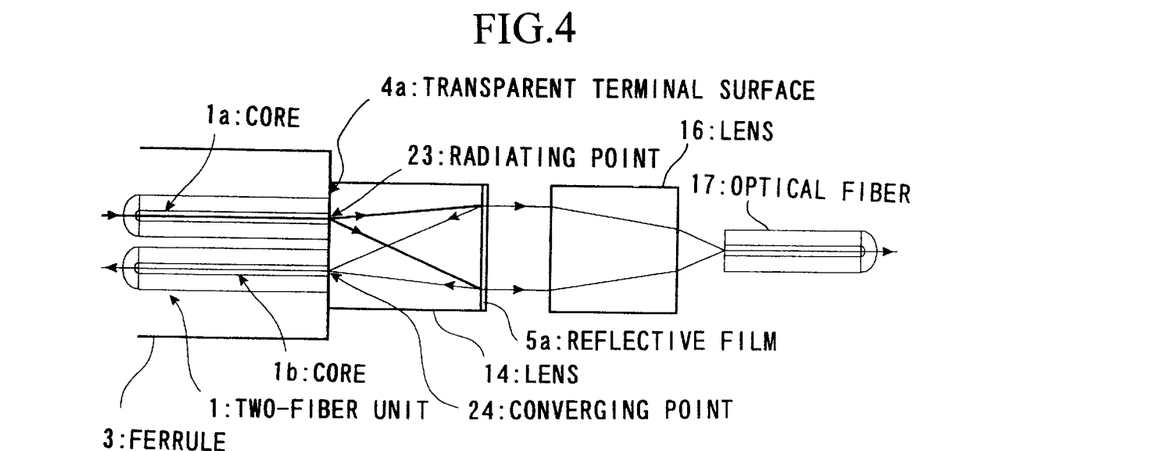
FIG. 4 is a cross sectional side view of a third embodiment of the loopback apparatus of the present invention.

FIG. 4 is a cross sectional side view of a third embodiment of the optical loopback apparatus. In FIG. 4, those parts which are the same as those in FIGS. 1 to 3 are given the same reference numerals, and their explanations are omitted.

The lens 14 shown in FIG. 4 has a refractive index distribution of 0.25, and one terminal surface (right end surface in FIG. 4) of the lens 14 is provided with a reflective film 5a. In this embodiment also, the central axis of the cores 1a, 1b is aligned with the optical axis of the lens 14.

In this case, the beam of light which passes through the lens 14 is converged by a lens 16 and is propagated through an optical fiber 17. The optical axes of the lens 16 and optical fiber 17 are all aligned with the optical axis of lens 14.

Input beam injected into the two fiber unit 1 is divided into a beam reflected by the reflection film 5a formed on the lens 14 and a beam transmitted through the reflective film 5a. For example, suppose the reflection factor of the film 5a is 50%, then 50% of the light entering the lens 14 is looped back to the core 1b of the two fiber unit 1 and the remaining 50% is output from the reflective film 5a as transmitted light.

Transmitted beam passing through the reflective film 5a is converged by the lens 16 and is received by optical fiber 17 to propagate therethrough.

A loopback apparatus having such a construction can easily function as an optical splitter (optical distributor) also, and the distribution ratio can have any value by suitably selecting the reflection factor of the reflective film 5a.

Embodiment 4

Figure 5:
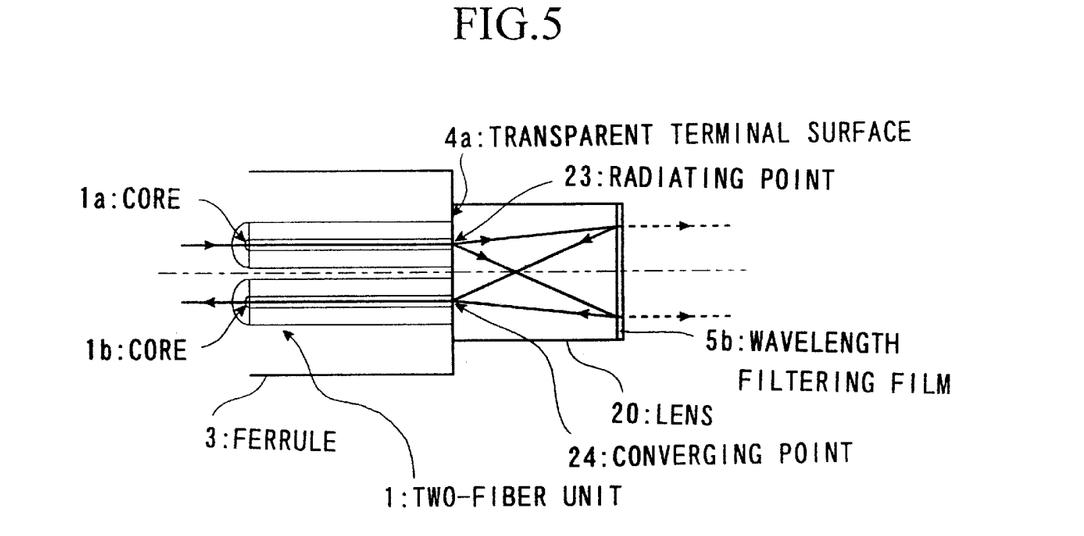
FIG. 5 is a cross sectional side view of a fourth embodiment of the loopback apparatus of the present invention.

FIG. 5 is a cross sectional side view of a fifth embodiment of the loopback apparatus. In FIG. 5, those parts which are the same as those in FIGS. 1 to 4 are referred to by the same reference numerals, and their explanations are omitted.

The lens 20 shown in FIG. 5 has a refractive index distribution of 0.25, and one terminal surface (right end surface in FIG. 5) of the lens 20 is provided with a wavelength filtering film 5b. In this embodiment also, the central axis of the cores 1a, 1b of the fiber unit 1 is aligned with the optical axis of the lens 20.

The wavelength filtering film 5b reflects or transmits light of any selected wavelength and its reflection factor can be chosen to suit any application.

For example, suppose the wavelength filtering film 5b transmits light of wavelength 1300 nm while reflects light of wavelength 1550, then, of the total light input into the core 1a and the lens 20, only a component of the light having a wavelength of 1550 nm is reflected back to the core 1b.

The light not reflected at the wavelength filtering film 5b is either absorbed in the wavelength filtering film 5b or transmitted through the wavelength filtering film 5b to emerge from the lens 20.

The optical loopback apparatus of such a construction can easily function as an optical filter, so that cutoff- and pass-wavelengths can have any value by appropriately selecting the properties of the wavelength filtering film 5b.

Embodiment 5

Figure 6A:
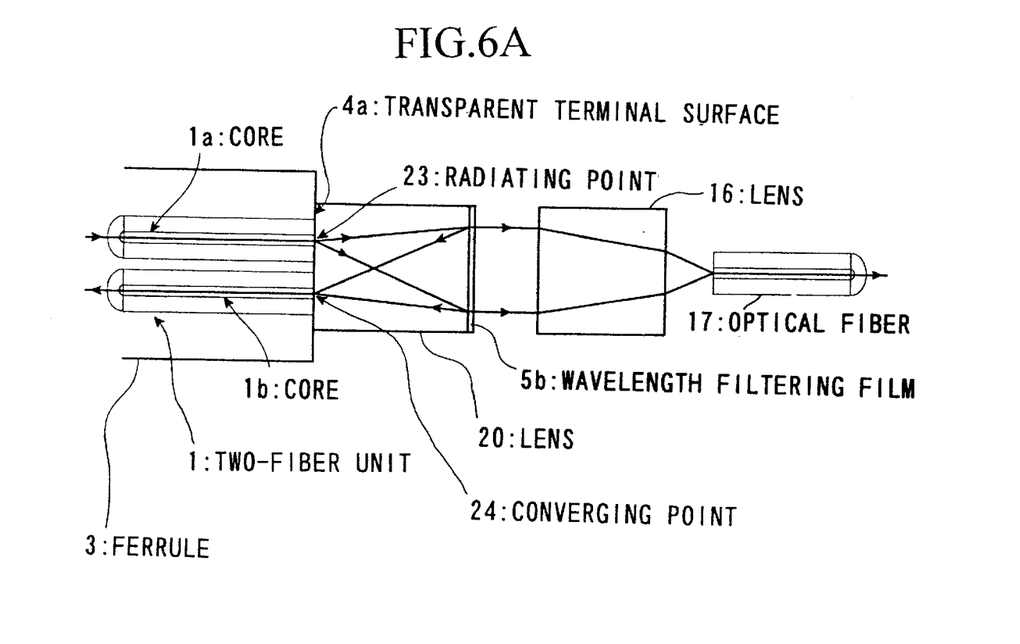
FIGS. 6A, 6B are cross sectional side views of a fifth embodiment of the loopback apparatus of the present invention.
Figure 6B:
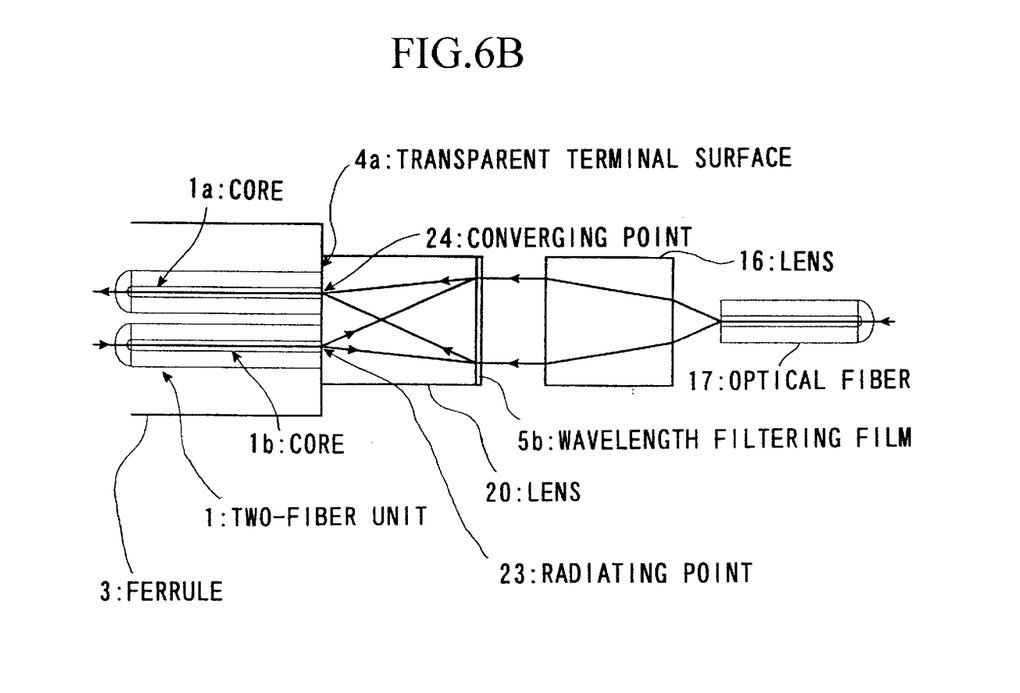

FIGS. 6A and 6B are cross sectional side views of a sixth embodiment of the loopback apparatus. In FIGS. 6A & 6B, those parts which are the same as those in FIGS. 1 to 5 are referred to by the same reference numerals, and their explanations are omitted.

FIG. 6A relates to the use of the present loopback apparatus as an optical multiplexer device and FIG. 6B relates to the use of the present loopback apparatus as an optical demultiplexer device. In this embodiment also, the optical axis of the cores 1a, 1b of the two fiber unit 1 are aligned with the optical axis of the lens 20, and the optical axes of the lens 16 and the fiber 17 are aligned with the optical axis of the lens 20.

In FIG. 6A, suppose the wavelength filtering film 5b transmits light of wavelength 1300 nm and reflects light of wavelength 1550 nm, then, of the light input into the core 1a and the lens 20, only the light having wavelength of 1550 nm is reflected back to be propagated through the core 1b.

In the meantime, light of 1300 nm wavelength passes through the wavelength filtering film 5b. Therefore, the light output from the lens 20 is converged by the lens 16, and is received in and propagated through the optical fiber 17. [ADDED FOR CLARIFICATION, IF NOT WANTED, PLEASE DELETE] Therefore, input beam having two different wavelengths from one optical path is output from two optical paths, thereby providing a basis for a wavelength multiplexing device.

FIG. 6B also relates to a case of a wavelength filtering film 5b transmitting light of 1300 nm wavelength while reflecting light of 1550 nm wavelength, as in the case shown in FIG. 6A. In this case, the input beam which is injected through the core 1b of the two fiber unit 1 is made to have a wavelength of 1550 nm while the input beam which is injected through the optical fiber 17 is made to have a wavelength of 1300 nm.

In the apparatus shown in FIG. 6B, the input beam propagated through the core 1b of the two fiber unit 1 is reflected by a wavelength filtering film 5b formed on the lens 20, and is output through the core 1a.

In the meantime, the input beam propagated through the optical fiber 17 is converted into a parallel beam by the lens 16 and is input into the wavelength filtering film 5b and is transmitted therethrough. The transmitted beam is converged by the lens 20 to a converging point 24, and is output from the core 1a together with the beam input through the core 1b. In other words, an output beam having two different wavelengths is output from a common optical fiber, thereby providing a basis for a wavelength demultiplexing device.

An apparatus having such a construction can easily provide a multi/demutiplexer function using an optical loopback arrangement, so that the transmitted wavelength can have any value by selecting an appropriate property for the wavelength filtering film 5b.

It should be noted that any of the foregoing examples are intended to be illustrative within the principle disclosed so that the applicability of the present invention are not to be restricted in any way by any specific details, such as the size and the wavelengths cited in the examples.

What is claimed is:

1. An optical loopback apparatus comprising:

a first optical fiber having an input fiber path and an output fiber path formed into an integral parallel unit; and a first lens having a one terminal surface coupled optically to one end section of said first optical fiber and having a reflective film formed on an other terminal surface opposing said one terminal surface, wherein said first lens is provided with a refractive index distribution having a 0.25 pitch, and wherein a central axis between said input fiber path and said output fiber path is aligned with an optical axis of said first lens.

2. An apparatus according to claim 1, wherein said reflective film comprises a total reflection film which reflects a beam injected into said input fiber path back to said output fiber path without loss of optical energy.

3. An apparatus according to claim 1, wherein said reflective film comprises a film having a selected optical attenuation factor and reflects back a beam injected into said input fiber path at a specific reflection factor to said output fiber path.

4. An apparatus according to claim 1, wherein said reflective film comprises a specific wavelength-selective film and reflects back, in whole, such light having not less than one specific wavelength or such light having not less than a specific range of wavelengths to be output from said output fiber path.

5. An optical loopback apparatus comprising:

a first optical fiber having an input fiber path and an output fiber path formed into an integral parallel unit;

a first lens having a one terminal surface coupled optically to one end section of said first optical fiber and having a reflective film formed on an other terminal surface opposing said one terminal surface;

a second lens having a one terminal surface opposing said reflective film formed on said first lens; and a second optical fiber having an input surface opposing an other terminal surface of said second lens; wherein a central axis between said input fiber path and said output fiber path, an optical axis of said first lens, an optical axis of said second lens and an optical axis of said second optical fiber are aligned.

6. An apparatus according to claim 5, wherein said first lens is provided with a refractive index distribution having a 0.25 pitch.

7. An apparatus according to claim 5, wherein said reflective film is comprised by a reflective film which reflects back a beam of light injected into said input fiber path at a specific reflection factor and transmits remaining portion of light at a selected optical transmission factor to be output to said second optical fiber, thereby distributing said input beam of light in a specific distribution ratio.

8. An apparatus according to claim 6, wherein said reflective film is comprised by a reflective-film which reflects back a beam of light injected into said input fiber path at a specific reflection factor and transmits remaining portion of light at a selected optical transmission factor to be output to said second optical fiber, thereby distributing said input beam of light in a specific distribution ratio.

9. An apparatus according to claim 5, wherein said reflective film is comprised by a wavelength-selective film reflecting back, in whole, such light having not less than one wavelength or a specific range of wavelengths, to said output fiber path, while transmitting such light having not less than one wavelength or not less than a specific range of wavelengths, exclusive of a reflected wavelength, through said output fiber path, thereby providing a wavelength multi/demultiplexing capability.

10. An apparatus according to claim 6, wherein said reflective film is comprised by a wavelength-selective film reflecting back, in whole, such light having not less than one wavelength or a specific range of wavelengths, to said output fiber path, while transmitting such light having not less than one wavelength or not less than a specific range of wavelengths, exclusive of a reflected wavelength, through said output fiber path, thereby providing a wavelength multi/demultiplexing capability.

* * * * *